UNITED STATES PATENT OFFICE.

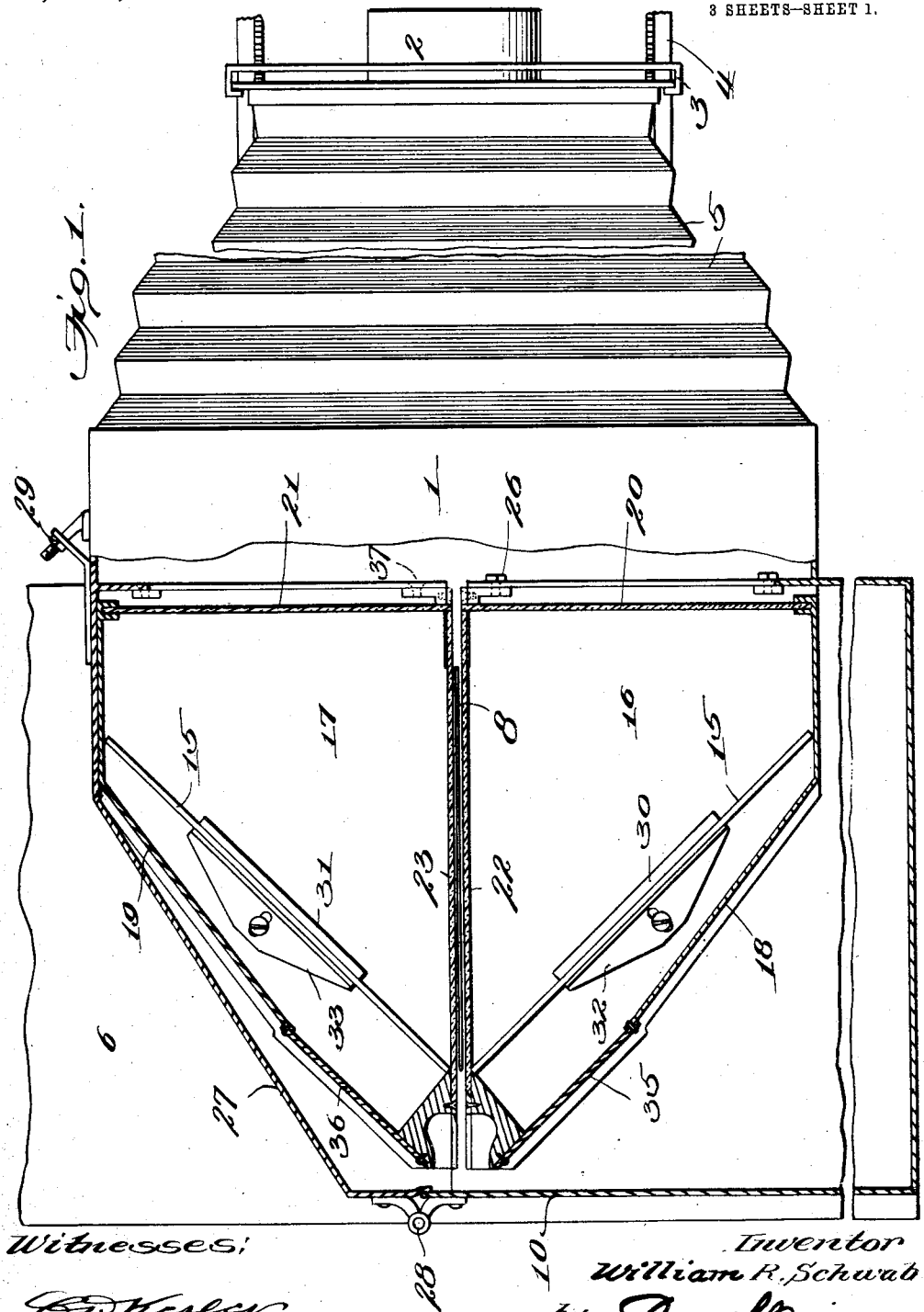

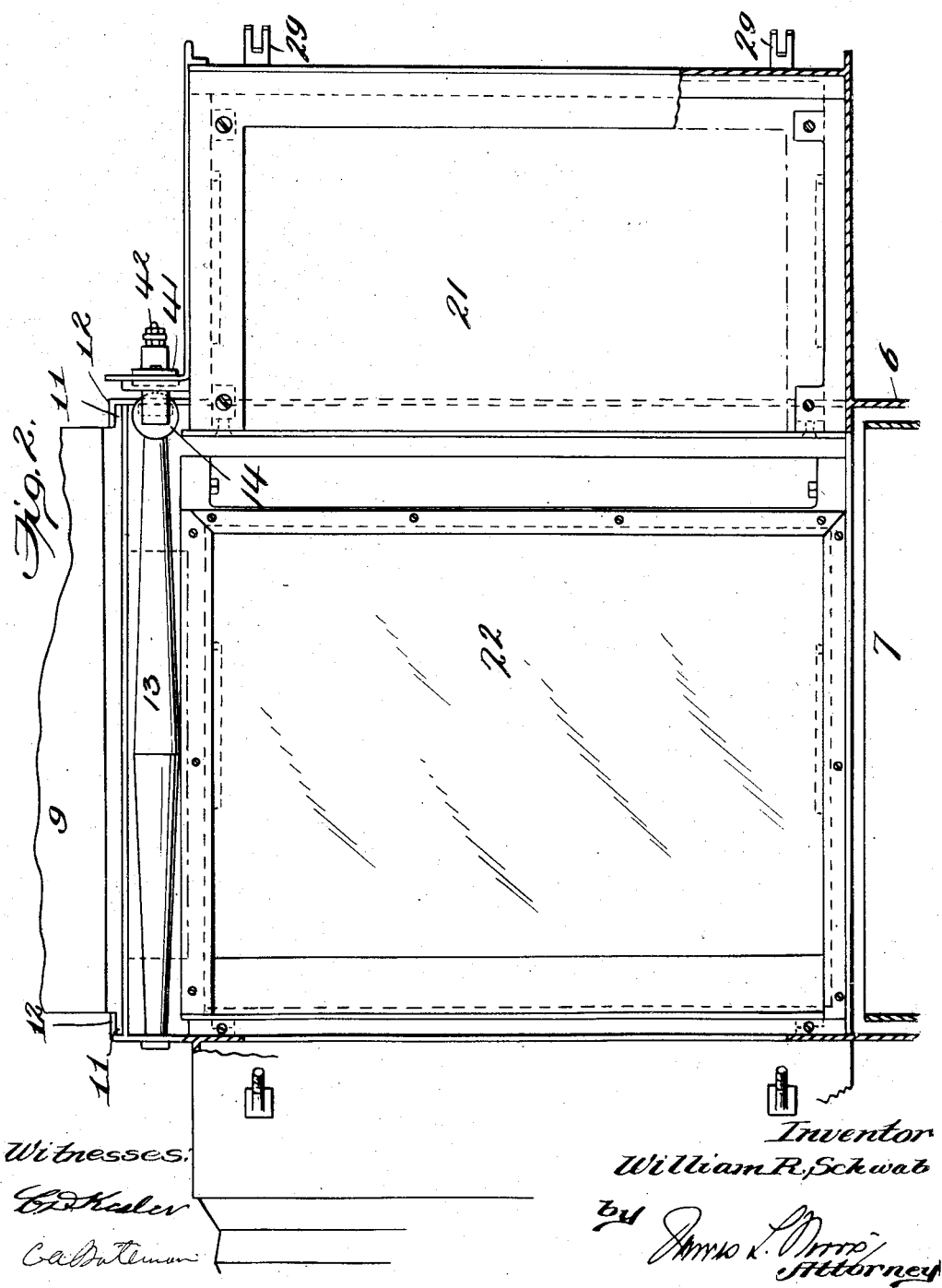

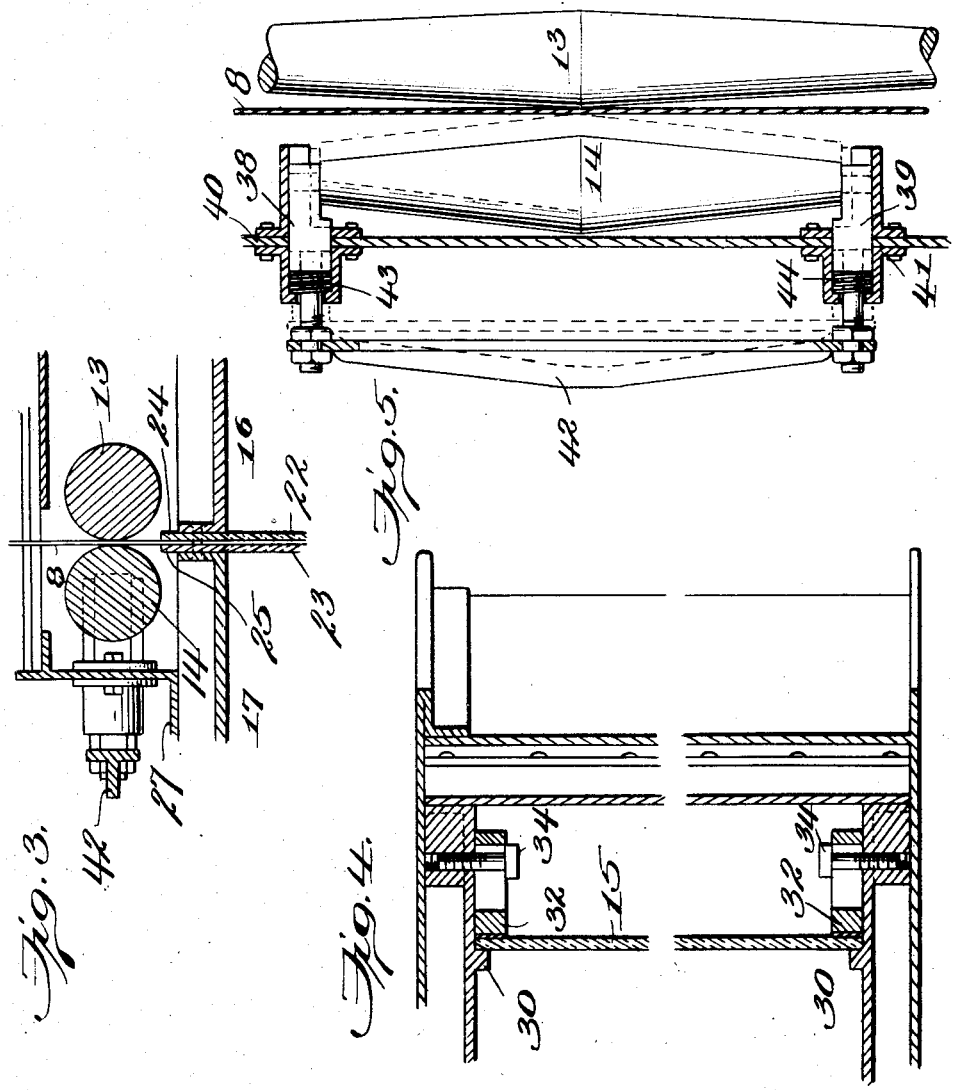

WILLIAM R. SCHWAB, OF KANSAS CITY, MISSOURI, ASSIGNOR TO THE CAMERAGRAPH COMPANY, OF KANSAS CITY, MISSOURI, A CORPORATION OF ARIZONA.

PHOTOGRAPHIC APPARATUS.

1,084,492.  Specification of Letters Patent.  Patented Jan. 13, 1914.

Application filed January 6, 1913. Serial No. 740,504.

*To all whom it may concern:*

Be it known that I, WILLIAM R. SCHWAB, a citizen of the United States, residing at Kansas City, in the county of Jackson and State of Missouri, have invented new and useful Improvements in Photographic Apparatus, of which the following is a specification.

My present invention relates to improvements in photographic apparatus and more especially to apparatus adapted to be used for the purpose of reproducing photographically books, documents, records and the like, and the primary object of the invention is to provide an optical system for apparatus of this character whereby better results are obtainable as compared with such apparatus as heretofore proposed and access to the interior of the machine is facilitated, the construction being such that maintenance of a correct relation between the parts thereof is insured.

The present embodiment of the invention is an improvement or further development of that disclosed and claimed in my prior Patent No. 1,003,300 granted September 12, 1911, the present invention enabling the use of mirrors or reflectors having the silver or reflecting medium arranged on the forward side of the glass or support without liability of the atmosphere or the vapors of the developing and fixing chemicals oxidizing, fogging or otherwise impairing the efficiency of the silver or reflecting medium, or dust or foreign matter accumulating thereon, and also the apparatus embodies means whereby the optical parts thereof can be readily separated or opened to render accessible the interior of the apparatus, the correct relation between these parts being, however, preserved or maintained and, hence, displacement thereof is avoided.

To these and other ends, the invention consists in certain improvements, and combinations and arrangements of parts, all as will be hereinafter more fully described, the novel features being pointed out particularly in the claims at the end of the specification.

In the accompanying drawings:—Figure 1 is a view, partly in horizontal section and partly in plan, of a portion of photographic apparatus constructed in accordance with the present invention; Fig. 2 is an elevation of a portion of the apparatus showing the same in open position to permit access to the interior thereof; Fig. 3 is a detail sectional view of the rollers for feeding the sensitized material to the optical field of the lens, and the related parts; Fig. 4 represents a section through one of the reflector elements of the optical system; Fig. 5 shows in top plan view the feed rollers.

Similar parts are designated by the same reference characters in the several views.

The accompanying drawings show the present invention as applied to a photographic exposing, developing and fixing machine of the general type disclosed in Letters Patent to Calvin J. Ellis, No. 929,757 granted August 3, 1909, and the optical system shown in these drawings is a further development of that disclosed and claimed in my prior patent aforesaid. It will be understood, however, that the invention is not restricted to the precise construction shown, as equivalent constructions may be devised and used by those skilled in the art which equivalent constructions will be included within the scope of the claims at the end of the specification.

In the present instance, 1 designates the body or box of the camera, and 2 designates the lens thereof, this lens being mounted as usual on a lens front 3 which is adjustable longitudinally on the bed or track 4 for focusing purposes, and the lens front is connected to the body of the camera by a flexible bellows 5.

6 designates the lower section of a casing of the machine which contains the receptacles 7 for the developing and fixing solutions, and these receptacles may be reciprocated by a horizontally movable shelf, for example, as shown in the Ellis patent aforesaid.

The apparatus shown in the present instance is adapted to simultaneously expose both sides of a strip 8 of paper or other appropriate material having sensitized surfaces on both sides thereof, the exposure of the two sides of the sensitized medium being effected through the single lens 2 and by the aid of reflectors or equivalent means which divert the light rays from the lens to the opposite sides of the sensitized medium. The sensitized medium is preferably in the form of a strip which may be unwound from a roll contained in a casing 9,-the latter being removably applied to the top of a casing 10 and said casing 9 is retained on the casing 10 by flanges 11 at the opposite sides of the casing which slidably engage with guides 12. Suitable means is provided for advancing the strip 8 to bring portions thereof successively into the optical field of the lens, a pair of feed rollers 13 and 14 being provided for this purpose in the present instance, the roller 13 being journaled at its ends in the opposite sides of the casing 10 and any suitable means may be used to rotate this roller at appropriate intervals and thereby advance the sensitized medium as needed. The light rays from the lens 2 are directed upon the opposite sensitized surfaces of the strip 8 by a pair of reversely arranged mirrors, reflectors, or equivalent devices 15 which occupy a predetermined or fixed angular relation to one another as well as to the sensitized medium and the optical axis of the lens. Experience has shown that the best results are obtained by using mirrors or reflectors, each of which embodies a glass plate having a coating of silver applied directly to its forward or exposed side, as this construction produces a single sharply defined image as distinguished from a mirror composed of a glass plate having its rear side silvered, for the reason that in the latter case, a secondary image is produced by the forward or unsilvered surface of the glass which acts, to some degree, as a mirror or reflecting medium, the secondary image impairing, to a considerable degree, the definition of the primary image. It is necessary, however, in using the improved form of mirror with the silvered surface exposed, to protect such surface not only from atmospheric influences, but also from the vapors of the chemicals which are used to develop and fix the sensitized material after the same has been exposed, it being observed that the developing and fixing solutions are contained in receptacles immediately below the mirrors or reflectors. The present invention provides a construction whereby mirrors or reflectors of the construction described can be used advantageously. Such mirrors will be well protected from atmospheric influences as well as from the chemicals, and also access may be had readily to the interior of the apparatus. In the present instance, a pair of reflector units 16 and 17 is employed, these units having suitable casings 18 and 19 which are closed at all points, except at the front and one side, glass plates 20 and 21 being fitted in the front sides of the units, and glass plates 22 and 23 being fitted at the adjacent sides of the units, the light rays from the lens passing through the glass plates 20 and 21 and being reflected by the mirrors 15 through the glass plates 22 and 23 respectively to the opposite sides of the sensitized medium 8, and the glass plates 22 and 23 serving as closely related guides which serve to position the sensitized medium accurately in the focal plane of the lens.

The units 16 and 17 are substantially duplicates in construction although arranged in reverse relation, the upper adjacent edges of the units being provided with upstanding flanges 24 and 25 to properly guide the strip as it leaves the feed rollers 13 and 14 and enters between the glass plates 22 and 23. The unit 16, however, occupies a fixed position within the casing 10, it being fastened therein, for example, by the screws 26, while the unit 17 is movable relatively to the unit 16 whereby a relative separating movement may be had between the units, thus opening up the space between the glass plates 22 and 23 and enabling the operator to obtain access to such space through which the paper passes as well as to the different glass walls which inclose the inner and forward sides of the units. Preferably, a hinged casing section 27 is employed for the unit 17, this section being hinged to the casing 10 by the hinges 28 and suitable catches 29 may be used to retain this hinged casing section in operative position, it being understood that when the casing section 27 is closed it not only forms a light-tight joint with the remainder of the casing, but it also brings the reflector unit 17 into correct operative relation to the unit 16.

The reflectors may be accurately positioned within their respective casings by the ribs or stops 30 and 31 respectively and held firmly in such position by the clamps 32 and 33, there being a pair of these ribs and clamps to coöperate with the upper and lower edges of each reflector, and as shown in Fig. 4, screws 34 may be used to lock the clamps in appropriate adjusted position, the clamps being preferably slotted, as shown, to provide for the necessary movement thereof. Access may be had to the reflectors by removing the panels 35 and 36 of the respective mirror casings. The mirror unit 17 may be fastened within the hinged casing section 27 in any suitable way, the screws 37 serving such purpose in the present instance.

The feed roller 14 is preferably carried by the hinged casing section 27 in order that this roller may disengage from the strip of sensitized material when the casing section is opened. This feed roller is also yieldably held in coöperative relation with the strip of sensitized material and is provided with a handle whereby it may be retracted to release its grip upon the strip and thereby permit independent movement of the strip, such, for example, as occurs when the strip is rewound. In the present instance, the ends of the roller 14 are journaled in a pair of slides 38 and 39, these slides operating in casings 40 and 41 respectively, and the two slides are connected by a handle 42 which is arranged exteriorly of the hinged casing section 27 and may be readily grasped and manipulated by hand. Coiled compression springs 43 and 44 are used in the present instance to yieldably press the feed roller 14 against the strip, these springs acting in the construction shown against shoulders on the respective slides 38 and 39.

I claim as my invention:—

1. In photographic apparatus, the combination of a lens, and a pair of elements arranged to receive a sensitized surface between them and embodying optical elements for directing rays from the lens toward opposite sides of said surface, said elements being relatively movable to render accessible the space between them.

2. In photographic apparatus, the combination of a lens, a pair of reflectors arranged to direct rays from the lens toward opposite sides of a sensitized medium positioned between them, and means combined as a unit with each reflector to guide and position said medium in exposing position relatively to the lens, one of the reflectors and the respective guiding means being movable bodily in a direction toward and from the other reflector and guiding means.

3. In photographic apparatus, the combination of a casing, a lens, reflectors for directing rays from the lens toward a common focal plane, opposed members for positioning a sensitized medium in the focal plane, and means for moving one of the reflectors and its respective member bodily to and from operative position.

4. In photographic apparatus, the combination of a lens, a pair of reflectors arranged to direct rays from the lens to a common focal plane, transparent plates inclosing said reflectors at points between them and the lens, and transparent plates inclosing the reflectors at opposite sides of the focal plane.

5. In photographic apparatus, the combination of a lens, a pair of adjacently arranged members, each embodying a casing, a reflector inclosed therein, and transparent plates inclosing the adjacent and forward sides of the casing, the adjacent plates operative to position a sensitized medium in a common focal plane toward which the rays are directed by the reflectors.

6. The combination of a casing, a lens supported thereby, a reflector mounted in fixed relation within the casing, transparent plates inclosing two sides of the reflector, one of said plates serving to guide and position a sensitized medium in a given plane, a reflector complemental to that first mentioned and having transparent plates inclosing two sides thereof, and a hinged casing section having said complemental reflector and its respective transparent plates mounted therein and adapted to swing such parts bodily to and from operative position.

7. In photographic apparatus, the combination of a lens, a reflector for directing rays from the lens to a sensitized medium positioned in a given plane, and a casing containing the reflector and having transparent plates through which the rays pass to and from the reflector, said casing and plates forming a tight closure which protects the operative face of the reflector.

In testimony whereof I have hereunto set my hand in presence of two subscribing witnesses.

WILLIAM R. SCHWAB.

Witnesses:
A. L. PARKS,
RUTH WHEELER.